(12) United States Patent
Rohleder et al.

(10) Patent No.: US 9,904,802 B2
(45) Date of Patent: Feb. 27, 2018

(54) SYSTEM ON CHIP

(71) Applicants: Michael Rohleder, Unterschleissheim (DE); Stefan Singer, Vaterstetten (DE); Manfred Thanner, Neubiberg (DE)

(72) Inventors: Michael Rohleder, Unterschleissheim (DE); Stefan Singer, Vaterstetten (DE); Manfred Thanner, Neubiberg (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/647,089

(22) PCT Filed: Nov. 23, 2012

(86) PCT No.: PCT/IB2012/056671
§ 371 (c)(1),
(2) Date: May 23, 2015

(87) PCT Pub. No.: WO2014/080248
PCT Pub. Date: May 30, 2015

(65) Prior Publication Data
US 2015/0310229 A1    Oct. 29, 2015

(51) Int. Cl.
G06F 21/71    (2013.01)
H04L 29/06    (2006.01)
G06F 21/78    (2013.01)
G06F 21/74    (2013.01)
G06F 21/62    (2013.01)

(52) U.S. Cl.
CPC .......... *G06F 21/71* (2013.01); *G06F 21/6218* (2013.01); *G06F 21/74* (2013.01); *G06F 21/78* (2013.01); *H04L 63/105* (2013.01); *G06F 2217/66* (2013.01)

(58) Field of Classification Search
CPC .......... G06F 21/71; G06F 21/74; G06F 21/78; G06F 2221/2113; H04L 63/105
See application file for complete search history.

(56) References Cited

U.S. PATENT DOCUMENTS

| 4,890,223 A | 12/1989 | Cruess et al. |
| 6,292,888 B1 | 9/2001 | Nemirovsky |
| 6,775,750 B2 | 8/2004 | Krueger |

(Continued)

FOREIGN PATENT DOCUMENTS

| JP | 2003150450 | 5/2003 |
| JP | 2009524140 | 6/2009 |

(Continued)

OTHER PUBLICATIONS

International Search Report and Written Opinion correlating to PCT/IB2012/056671 dated Aug. 23, 2013.

(Continued)

*Primary Examiner* — Thaddeus Plecha

(57) ABSTRACT

A system on chip having two or more responder units and two or more protection units is provided. Each of the responder units comprises a set of responder elements. Each of the protection units is associated with and protects one of the responder units and is arranged to provide a group mapping. The group mapping assigns one or more group identifiers to each of the responder elements of the respective responder unit.

20 Claims, 5 Drawing Sheets

| 1 | T12, M0 | us---rx---e | mem_range_A |
| 2 | T12, M0 | us---rw---e | mem_range_B |
| 3 | T12, M0 | us---rw---c | IP22 |
| 4 | T63, M0 | us---w---c | IP38, set_D |
| 5 | T17, M4 | us---rx---e | mem_range_C |
| 6 | T24, Mx | us---r---c | mem_range_X |
| 7 | T28, M0 | s—rw---e | IP12 |
| 8 | T99, M0 | us---rw---c | IP38, set_H |

← 38

(56) References Cited

U.S. PATENT DOCUMENTS

| | | | |
|---|---|---|---|
| 6,981,149 B1* | 12/2005 | Housley | H04L 9/06 713/166 |
| 7,107,382 B2 | 9/2006 | Clayton | |
| 7,478,178 B2 | 1/2009 | Torudbakken et al. | |
| 7,521,761 B2 | 4/2009 | Satsukawa | |
| 7,543,126 B2 | 6/2009 | Lewis | |
| 7,558,923 B1 | 7/2009 | Bennett et al. | |
| 7,710,758 B2 | 5/2010 | Jo | |
| 7,793,345 B2 | 9/2010 | Weber et al. | |
| 7,921,431 B2 | 4/2011 | Smart | |
| 7,996,593 B2 | 8/2011 | Blackmore et al. | |
| 7,996,836 B1 | 8/2011 | McCorkendale et al. | |
| 8,036,243 B2 | 10/2011 | Georgiou et al. | |
| 8,069,325 B2 | 11/2011 | Vermeulen et al. | |
| 8,135,962 B2 | 3/2012 | Strongin et al. | |
| 8,346,997 B2 | 1/2013 | Freimuth et al. | |
| 8,427,193 B1* | 4/2013 | Trimberger | H03K 19/003 326/38 |
| 8,719,526 B2 | 5/2014 | Chen et al. | |
| 8,789,170 B2 | 7/2014 | Sastry et al. | |
| 9,336,411 B2* | 5/2016 | Rohleder | G06F 21/74 |
| 2004/0199700 A1 | 10/2004 | Clayton | |
| 2005/0091432 A1 | 4/2005 | Adams et al. | |
| 2005/0132365 A1 | 6/2005 | Madukkarumukumana et al. | |
| 2005/0246453 A1 | 11/2005 | Erlingsson et al. | |
| 2006/0041705 A1 | 2/2006 | Bueti et al. | |
| 2006/0075146 A1 | 4/2006 | Schoinas et al. | |
| 2006/0090053 A1 | 4/2006 | Boning | |
| 2006/0123416 A1 | 6/2006 | Bertolotti et al. | |
| 2006/0129747 A1 | 6/2006 | Weber et al. | |
| 2006/0195618 A1 | 8/2006 | Arndt et al. | |
| 2006/0195645 A1 | 8/2006 | Ryan et al. | |
| 2006/0212606 A1 | 9/2006 | Ardnt et al. | |
| 2007/0005919 A1 | 1/2007 | Van Riel | |
| 2007/0039045 A1* | 2/2007 | McKee | G06F 21/604 726/21 |
| 2007/0192518 A1 | 8/2007 | Rupanagunta | |
| 2009/0083829 A1 | 3/2009 | Peterson | |
| 2009/0157979 A1 | 6/2009 | Gregg et al. | |
| 2009/0228711 A1* | 9/2009 | Lim | G06F 21/575 713/182 |
| 2009/0230255 A1* | 9/2009 | Lemonovich | G06F 15/17 246/167 R |
| 2009/0275407 A1 | 11/2009 | Singh et al. | |
| 2010/0042759 A1 | 2/2010 | Srinivasan et al. | |
| 2010/0162243 A1 | 6/2010 | Barde et al. | |
| 2010/0180056 A1* | 7/2010 | Matsuse | G06F 13/366 710/107 |
| 2010/0268905 A1 | 10/2010 | Reipold et al. | |
| 2010/0318822 A1 | 12/2010 | Scandurra et al. | |
| 2011/0067114 A1 | 3/2011 | Weber et al. | |
| 2011/0119423 A1 | 5/2011 | Kishore et al. | |
| 2011/0191562 A1 | 8/2011 | Chou et al. | |
| 2012/0079479 A1 | 3/2012 | Hakewill | |
| 2012/0117301 A1 | 5/2012 | Wingard | |
| 2013/0111168 A1 | 5/2013 | Circello et al. | |
| 2013/0346928 A1* | 12/2013 | Li | G06F 21/75 716/103 |
| 2014/0137231 A1 | 5/2014 | Sastry et al. | |
| 2014/0259128 A1 | 9/2014 | Fear | |
| 2016/0028728 A1 | 1/2016 | Hampel et al. | |
| 2016/0156632 A1 | 6/2016 | Rohleder et al. | |
| 2016/0350549 A1 | 12/2016 | Hampel et al. | |

FOREIGN PATENT DOCUMENTS

| | | |
|---|---|---|
| WO | 2014041395 A1 | 3/2014 |
| WO | 2014080247 A1 | 5/2014 |

OTHER PUBLICATIONS

Intel: "PCI-SIG Single Root 1/0 Virtualization (SR-IOV) Support in Intel® Virtualization Technology for Connectivity", Efficient Native Sharing of 1/0 Devices with Virtual Machines for enhancing 1/0 Performance, White Paper, Rev. 06/08-001US, 2008, pp. 1-4.
Fiorin et al. "A data protection unit for NoC-based architectures." Proceedings of the 5th IEEE/ACM international conference on Hardware/software codesign and system synthesis. ACM, 2007.
U.S. Appl. No. 14/483,273, filed Sep. 11, 2014.
Non-Final Office Action, U.S. Appl. No. 14/483,273, dated Dec. 9, 2016, 16 pages.
Notice of Allowance, U.S. Appl. No. 14/483,273, dated Mar. 23, 2017, 5 pages.
U.S. Appl. No. 14/422,058, filed Feb. 17, 2015.
Notice of Allowance, U.S. Appl. No. 14/422,058, dated Mar. 29, 2017, 16 pages.
Non-Final Office Action, U.S. Appl. No. 14/422,058, dated Feb. 3, 2017, 5 pages.
U.S. Appl. No. 14/899,338, filed Dec. 17, 2015.
Non-Final Office Action, U.S. Appl. No. 14/899,338, dated Apr. 4, 2017, 19 pages.
U.S. Appl. No. 14/442,241, filed May 12, 2015.
Notice of Allowance, U.S. Appl. No. 14/442,241, dated Jan. 29, 2016, 8 pages.
Non-Final Office Action, U.S. Appl. No. 14/442,241, dated Nov. 6, 2015, 4 pages.
Notice of Allowance, U.S. Appl. No. 14/422,058, dated May 5, 2017, 22 pages.
Notice of Allowance, U.S. Appl. No. 14/483,273, dated Apr. 21, 2017, 13 pages.

* cited by examiner

| 1 | T12, M0 | us---rx---e | mem_range_A |
| 2 | T12, M0 | us---rw---e | mem_range_B |
| 3 | T12, M0 | us---rw---c | IP22 |
| 4 | T63, M0 | us---w---c | IP38, set_D |
| 5 | T17, M4 | us---rx---e | mem_range_C |
| 6 | T24, Mx | us---r---c | mem_range_X |
| 7 | T28, M0 | s---rw---e | IP12 |
| 8 | T99, M0 | us---rw---c | IP38, set_H |

← 38

| # | REG NAME | GROUP | COMMENT |
|---|----------|-------|---------|
| 1 | GCR | G1, G2, G3 | GLOBAL CONTROL REGISTER |
| 2 | SR | G1, G2, G3 | GLOBAL STATUS REGISTER |
| 3 | IMR1 | G1 | IRQ MASK FOR CH1 |
| 4 | IMR2 | G2 | IRQ MASK FOR CH2 |
| 5 | IMR3 | G3 | IRQ MASK FOR CH3 |
| 6 | CH1_DR | G1 | DATA REG FOR REGISTER |
| 7 | CH1_SR | G1 | STATUS REG FOR CH1 |
| 8 | CH12_TR | G1, G2 | TX REG FOR CH1 AND CH2 |
| 9 | CH2_DR | G2 | DATA REG FOR CH2 |
| 10 | CH2_SR | G2 | STATUS REG FOR CH2 |
| 11 | CH3_DR | G3 | DATA REG FOR CH3 |
| 12 | CH3_DR | G3 | STATUS REG FOR CH3 |

40

42

| 1 | T* | M0 | us-rx-e | G1 |
|---|----|----|---------|----|
| 2 | T* | M1 | s-r-c | G1 |
| 3 | T* | M* | s-rw-e | G2 |
| 4 | T2 | M0 | su-rw-c | G3 |
| 5 | T99 | M* | u-r-c | G3 |
| 6 | T113 | M1 | u-rw-c | G3 |

.# SYSTEM ON CHIP

FIELD OF THE INVENTION

This invention relates to a system on chip.

BACKGROUND OF THE INVENTION

A system on a chip or system on chip (SoC) is an integrated circuit (IC) that comprises several functional units on a single chip. A system on chip may, for instance, be used as an embedded system in, e.g., a motor vehicle, mobile phone, or manufacturing plant. A SoC may notably comprise one or more master units that are capable to request the transfer of information. The SoC may further comprise a number of slave units arranged to provide an appropriate response to such a request. The complete sequence of the request by the master unit and the following response by the slave unit is named a transaction.

Each master unit may be programmable by software (e.g. a microprocessor) or non-programmable (e.g. a direct-memory access (DMA) device, or a peripheral bus master). Slave units may be e.g. be volatile (e.g. static random-access memory SRAM, or dynamic random-access memory DRAM) or non-volatile memory (Flash) arranged to hold program code and/or corresponding data, but also intellectual property (IP) blocks implementing other system functionality (e.g. timers, counters, or communication devices), The later ones are often referred as peripheral blocks, or in short as "peripherals". Some IP blocks can have a dual role, acting as a master requesting a transaction, but also as a slave responding to a transaction. To ensure clarity on the actual role of an IP block, in the following the term requestor unit and responder unit are used to refer respectively to a unit requesting a transfer of information and the unit responding to such a request.

Today's SoCs often comprise a set of features and functional blocks as well as memory space sufficient to allow a user or developer to add additional software to the SoC in order to provide additional functions. Such additional functions or add-ons may also make use of internal memory units or peripherals. For instance, an original equipment manufacturer (OEM) making use of such an SoC may sell a basic SoC that provides a certain number of functions and still has sufficient capacity for allowing a customer to add customer-specific functions. In this case, it may be important to shield the original system, i.e., the basic software provided by the OEM and the hardware blocks of this SoC used by this software, against such additions to insure the integrity and stability of the original system.

SUMMARY OF THE INVENTION

The present invention provides a system on chip as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
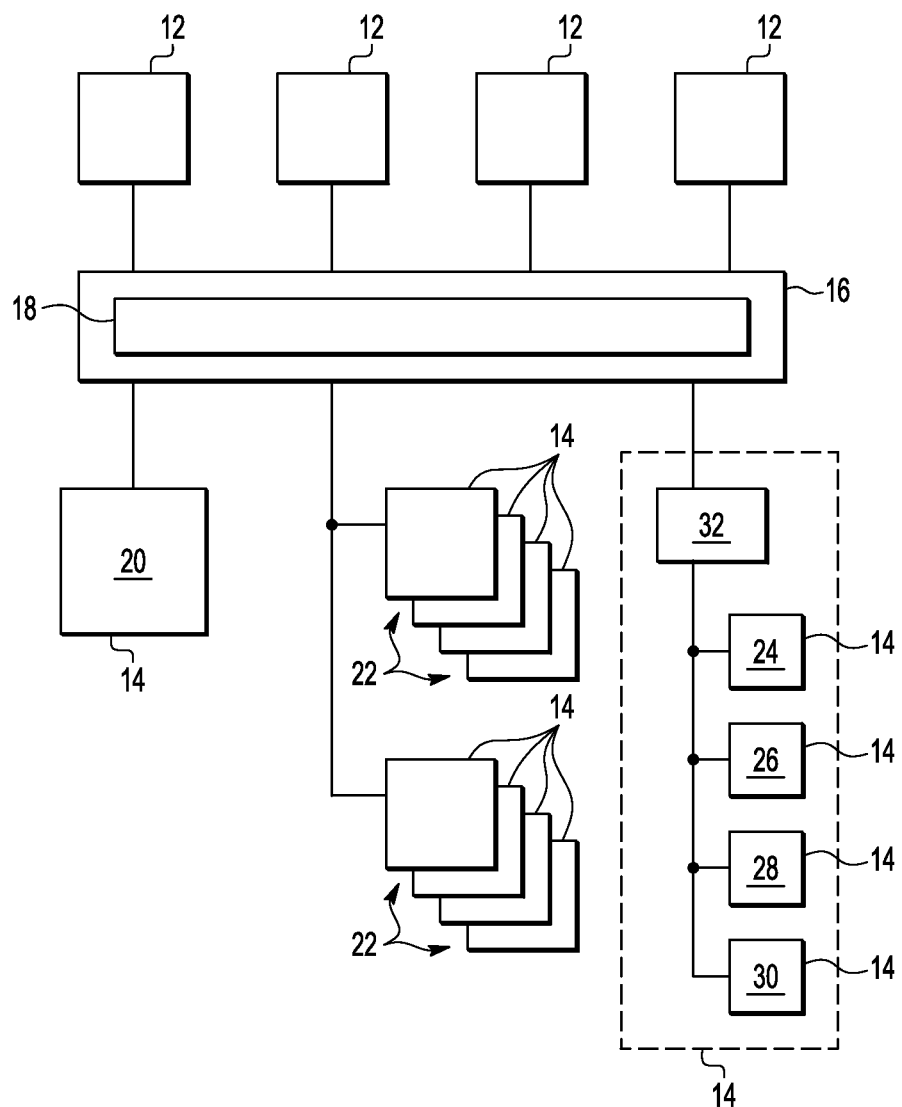
FIG. 1 schematically shows a block diagram of a first example of an embodiment of a system on chip.

FIG. 1 shows a first example of a system on chip 10. The SoC 10 may notably comprise one or more requestor units 12 and one or more responder units 14. The SoC 10 may, for instance, comprise one or more of the following responder units 14: a flash memory unit 20, several SRAM blocks 22 forming two contiguous address ranges of random access memory (RAM), and a group of integrated peripherals, 24, 26, 28, and 30 with a peripheral bridge 32. Each of the responder units 14 may be connected to each or at least some of the requestor units 12. The responder units 14 may, for instance, be connected to the requestor units 12 via an interface 16. The interface 16 may, for instance, be a crossbar switch for selectively connecting and disconnecting a given responder unit 14 to or from a given requestor unit 12.

Figure 2:
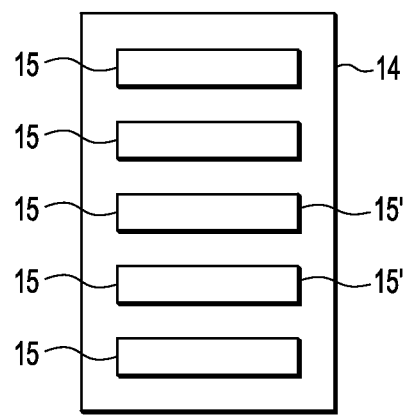
FIG. 2 schematically shows a block diagram of an example of an embodiment of a responder unit.

Each of the responder units 14 may comprise a set of responder elements 15, as shown schematically in FIG. 2. Each responder element 15 may, for instance, be one of the following: a memory cell, an input pin or an output pin, or any other kind of controllable hardware component (e.g. any combination of flip-flops, combinatorial logic). Each or a subset of the responder elements may be software-visible, i.e., it may be connected to one or more of the requestor units 12 such that the respective responder element 15 can be individually controlled by the respective requestor unit 12. Although only five responder elements 15 are shown in FIG. 2, each responder unit 14 may, in practice, comprise a very large number of responder elements 15. A responder unit 14 may, for instance, comprise only a few but also hundreds of software addressable registers as responder elements.

Furthermore, a group or set of responder units 14 can be combined to form itself a responder unit 14; or may—due to the access hierarchy of the system 10—act like a single responder unit 14. In the example of FIG. 1, each SRAM block 22, can be a responder unit 14; but also the complete set or a subset of the SRAM blocks 22, together with the corresponding logic block for accessing their memory cells as a whole, contiguous memory may be a responder unit 14. Again referring to the example of FIG. 1, any protection of accesses to the peripheral bridge 32 will also affect accesses to the connected peripherals (24, 26, 28, 30) due to the access hierarchy for these blocks. As such this group of peripherals connected to the peripheral bridge together with the peripheral bridge (24, 26, 28, 30, 32) may itself be a responder unit 14, but also each peripheral within this group may be a responder unit 14.

Referring back again to FIG. 1, the peripheral units 24, 26, 28 and 30 may, for instance, comprise or consist of one or more of the following group: a sensor unit, a timer unit, a communication unit, or a pulse-width modulation (PWM) unit. Each of these peripherals may be preconfigured by the manufacturer to provide a certain function, herein referred to as the original function. A certain subset of responder elements 15 of the respective peripheral, e.g., registers, may be dedicated to the original function. Another subset of responder elements 15 may be used by a customer to install a second function on the same peripheral. For instance, the customer may thus implement some control of an external sensor on a control peripheral or some motor control on top of a breaking device. One or more of the requestor units 12 or, more specifically, program code for controlling the requestor units 12, may be extended or modified for this purpose.

The SoC 10 may comprise at least one access control unit 18. A single access control unit 18 may, for example, be connected to at least one requestor unit 12, integrated in the interface 16 or be connected parallel to it. As explained below, the access control unit 18 enables to make the original function implemented by an SoC immune, or at least shield to a certain extent, against add-ons that may also be installed on the SoC 10, and enables the prevention of side effects or other unwanted impact of the added functions on the original function (and vice-versa). For example, access by an add-on to those responder elements 15 that are dedicated to the original function can be inhibited; or allowed only during time slices when these elements 15 are to be controlled by the add-on function. Such protection may be applied for example if the original function is a safety-relevant function such as control of a brake device in a vehicle, for instance.

The requestor units 12 may each be arranged to access any selected one of the responder elements 15 by issuing a corresponding request. A request may, for instance, specify a set of responder elements 15 as target responder elements 15' and a set of request properties. The request properties may, for instance, include information such as a type of operation to be performed on the target responder elements and information associated with the respective requestor unit 12 that issued the request. The access control unit 18 may comprise protection information and may be arranged to grant or refuse a request from a requestor unit 12 depending on whether or not the request conforms to the protection information specified for the target responder elements 15'.

Examples of different types of operations to be performed on the target responder element may include, for instance, write and read operations or set and get data transfers in a scenario in which the target responder elements 15' are memory cells, e.g., registers. A read operation may be defined as an operation involving a transfer of information from the target responder elements 15' to the requesting requestor unit 12. A write operation may be defined as an operation involving a transfer of information from the requesting requestor unit 12 to the target responder elements. A set operation may be defined as an operation involving a state change of the target responder elements. A get operation may be defined as an operation involving a transfer of information from the target responder elements 15' to the requesting requestor unit 12 without changing the state of the target responder elements 15'.

Figure 3:
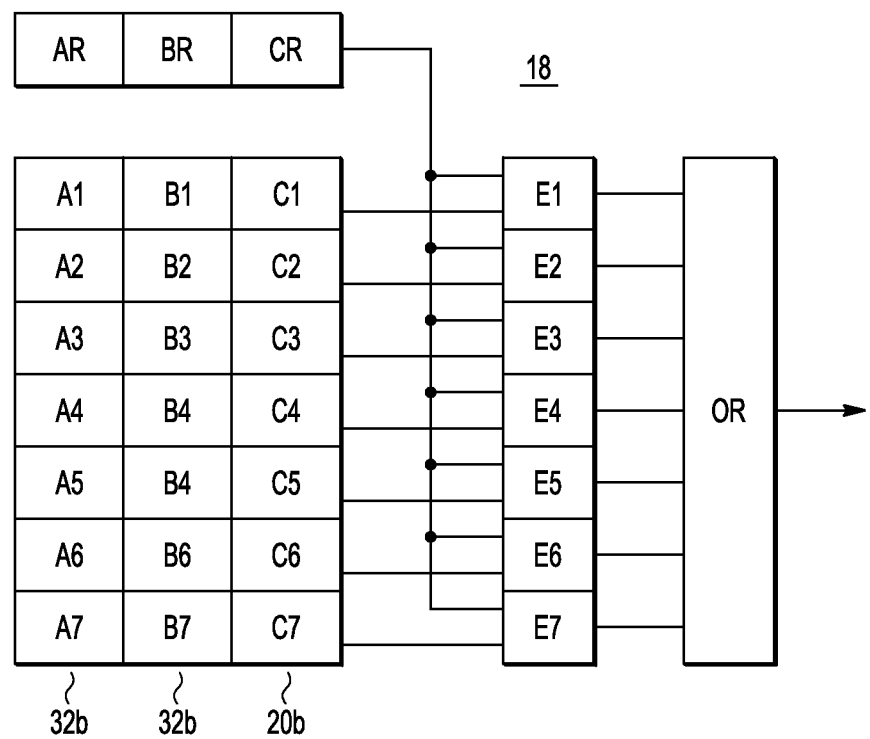
FIG. 3 schematically shows a block diagram of an example of an embodiment of an access control unit.

The protection information for a responder 14, a subset of elements of a responder 14 or a set of elements 15 may, for instance, be defined in terms of an authorization list, e.g., a range table. An example of an access control unit 18 having a range table is schematically shown in FIG. 3. The range table may, for instance, be stored within the memory control unit 18. At least part of the range table may be stored permanently to protect that part against accidental or malicious modification. For instance, the range table may comprise protection information relating to those responder elements 15 dedicated to an original function. The range table may comprise a set of lines or entries, each entry associated with a certain subset of target responder elements 15. In the shown example, the range table may comprise, for example, the entries with cells $A\_K$, $B\_K$, and $C\_K$, where K is an index specifying the respective entry. The range table shown comprises seven entries, and K ranges in this example from 1 to 7. The range table may, however, comprise a far greater number of entries, e.g several hundreds or more. The access control unit 18, in response to receiving a request may compare the request against the corresponding entry of the range table to determine whether or not the request is in accordance with the specific entry, e.g. compare elements $A\_R$, $B\_R$, $C\_R$ of the requests with the corresponding cells in the table.

Each entry K may, for instance, define a memory range. For example, $A\_K$ and $B\_K$ may be memory addresses relating to the beginning and the end of a certain memory range. Alternatively, each entry may specify the beginning of the range in question in $A\_K$ and a size of the memory range in $B\_K$. The size of the memory range may, for instance, be expressed in the number of consecutive responder elements 15 located in that range. Still referring to FIG. 3, the beginning and the end $A\_K$ and $B\_K$ of a range specified in the range table may each be provided in the form of a memory address. The memory address may, for instance, have a length of 32 bits.

Each entry K may further specify a set of access requirements $C\_K$. The access requirements may specify, for instance, one or more different allowed access types such as read, write, set, or get or one or more actor properties or access types as well as actor properties. An actor may be defined, for example, as a requesting requestor unit, e.g., one of the requestor units 12 shown in FIG. 1, in general or in conjunction with a specific task executed by the respective requestor unit to generate the request in question. An actor may also be defined as a specific task executed on any of the available requestor units 12 shown in FIG. 1. A task in this context refers to the usual notion of a software task, identifying a single or series of function calls that are performed by software; or functionality of a hardware block that is controlled by such a software task (e.g. DMA transfer(s) performed by a DMA block requested by a software task, or message buffer modifications by a communication peripheral, where the communication is started by a software task, etc. . . . ). As such an actor is specified by a combination of hardware (requestor unit) and software (task) identifiers; with the potential usage of wildcards to allow any requestor unit or any software task.

For instance, the access requirement specification C1 may indicate a requestor unit M0, and associated properties (e.g. read/write, user/supervisor, exclusive/shared access etc). The access control unit 18, in response to receiving a request (A_R, B_R, C_R) may compare the request against each entry or a pre-selection of entries (A_K, B_K, C_K) of the range table to determine whether or not the request is in accordance with the specific entry, e.g if the entry specifies only a read access to a certain memory range whether or not the request is a) a read access and b) pertains to the specified memory range for example.

As shown, the access control unit 18 may comprise a set of evaluation units E_K arranged to process the entries of the range table in parallel. This enables evaluation of the request, e.g. the request (A_R, B_R, C_R), with respect to the entire range table in a short period of time (e.g. within a single clock cycle) and enables abortion of an invalid request before it is forwarded to the corresponding target responder unit, e.g., one of the responder units 14, Thereby, partial processing of an invalid request and/or undue delay before the processing can start may be avoided.

Figures 4, 5:
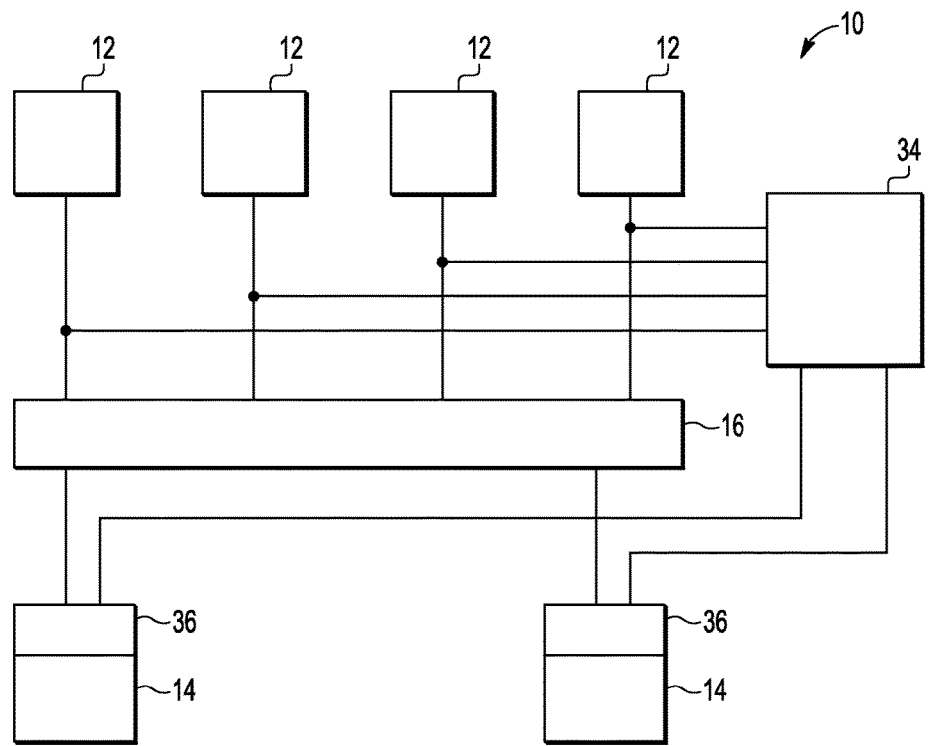
FIG. 4 schematically shows a block diagram of a second example of an embodiment of a system on chip.
FIG. 5 schematically shows an example of an embodiment of an authorization list.

Referring now to FIG. 4, another example of a system on chip 10 is shown. Only elements and functions not present in the example of FIG. 1, or any other differences, will be described herein below, In the example of FIG. 4 the SoC notably comprises two or more protection units 36, and a request analysis unit 34 not present in FIG. 1. Each of the requestor units 12 may be connected to the request analysis unit 34. Each of the responder units 14 may comprise one or more responder elements 15 (cf. FIG. 2) and may have associated with at least one protection unit 36. The (set of) protection unit(s) 36 may, for example, be connected to the respective responder unit 14, or be integrated therein, or both.

For the sake of completeness, it is noted that each of the responder units 14 may comprise one or more of the requestor units 12. Similarly, each of the requestor units 12 may comprise one or more of the responder units 14. In other words, a requestor unit may additionally act as a responder unit, and a responder unit may additionally act as a requestor unit, depending on the design.

The request analysis unit 34 may be connected between the requestor units 12 and the responder units 14 to analyze requests sent from the requestor units 12 to the responder units 14 via the interface 16.

The request analysis unit 34 may notably be arranged to select at least one of the protection units 36 as a target protection unit in response to a request from a requesting actor. For example, request analysis unit 34 may determine the target responder unit for a request and which protection unit(s) 36 are associated with the target responder unit. If there is only a single protection unit 36 associated with the target responder unit, that protection unit is selected as target protection unit 36. If there is a set of protection units 36 associated with the target responder unit, the request analysis unit may select one or more of the protection units in the set, e.g. a subset with at least one member, as the target protection unit. For example, the protection unit may be selected based on an address provided by the requestor. As explained above, an actor may be defined as a requestor unit, as a task running on a requestor unit, or as a requestor unit in conjunction with a task running on that requestor unit.

The SoC 10 may operate, for example, as follows. The request analysis unit 34 may receive a request which origi-nates from a requesting actor, e.g., from a task running on one of the requestor units 12, for access to one or more target responder elements 15' among the responder elements 15 within a target responder unit 14. The request may have a set of request properties. The set of request properties may, for instance, identify the requesting actor (e.g. by the task and/or master ID), include status information about this actor (e.g. user/supervisor, or test mode), or provide further details about the type of the requested access such as read, write, set, get, or execute, the size of the access and other properties.

The request analysis unit 34 may further determine relevant protection data on the basis of the received request and on the basis of an authorization list. The authorization list may, for instance, identify a single or a set of requesting actors by a combination of hardware properties (e.g. master ID M<x>) and software properties (e.g. task ID T<y>). It may further identify at least one responder element 15 within at least one responder unit 14. For example, the known memory range used by memory management or memory protection units are one possible implementation of an authorization list entry. Another example of an authorization list entry may identify a single or a set of responder unit(s) 14, eventually with additional information that identifies one or a set of responder elements 15 within this responder unit or units. In cases where the associated responder unit(s) 14 are memory elements (e.g. Flash, ROM or RAM memory, which are often implemented by multiple hardware blocks), the additional information may be a memory range within a single element or hardware block (using significantly less bits for specifying an address). In cases where the associated responder unit(s) 14 is/are a single peripheral block or a set of peripheral blocks, the additional information may identify a set of registers, an array of registers, or a single registers. In an alternative implementation the additional information for (a set of) peripheral block(s) the additional information may refer to a (set of) function(s) or a (set of) feature(s) implemented by a single peripheral block or a combination of blocks.

The request analysis unit 34 may determine the relevant protection data by evaluating each entry or every relevant entry of the authorization list. The authorization list may be updated to contain only entries related to the currently active hardware elements that can act as requestor units 12 to limit the amount of relevant entries. When determining the relevant protection data, the request analysis unit 34 takes only into account the set of access requirements specified by a respective entry, if one or more of the target responder elements 15' are part of the group of responder elements in this entry. The request analysis unit 34 may thus discard all entries of the authorization list which do not relate to at least one of the target responder elements 15' associated with the particular request. The request analysis unit 34 may thus perform a pre-selection of data of the authorization list.

The authorization list may comprise elements of a range table identical or similar to the one described above with reference to FIG. 3, but also different entries to identify protection information related to a memory range or peripheral blocks. It is noted that the authorization list may comprise one or more entries; and that each of these entries may be different in content and format or at least a portion of these entries may be different in content and format. Each entry may specify a group of one or more responder elements and a set of access requirements associated with this group of responder elements.

The request analysis unit 34 may provide the relevant protection data to those one or more protection units 36 that are associated with the target responder elements 15'. Alternatively, the corresponding data related to a protection unit might be stored in the protection unit itself and the request analysis unit provides only a selector to a particular set of the data. The request analysis unit 34 may notably indicate to a protection unit that this particular protection unit 36 is selected as the target protection unit. The target protection unit 36, in response to receiving the relevant protection data from the request analysis unit 34, may perform a protective action for the respective target responder elements 15' on the basis of the relevant protection data. The request analysis unit 34 may thus enable the specific protection unit 36 designated as a target protection unit to perform an appropriate protective action for the target responder elements 15'.

The work split described above has two key benefits: (a) it enables a responder unit specific encoding and processing of the protection information by the protection unit(s) 36, and (b) the work distribution between the request analysis unit(s) 34 and the protection unit(s) 36 enables some preprocessing by the request analysis unit and subsequently less stringent timing constraints for performing the protection of the selected target responder element(s) 15; especially since this processing may not be finished before the request reaches the protection unit 36 associated with the target responder unit 14.

An example of an authorization list 38 is schematically shown in FIG. 5. In the example shown, the authorization list comprises eight entries numbered 1 to 8. The authorization list may, however, comprise a far greater number of entries. As shown in this example, each entry may specify, e.g., a requesting actor (e.g. in form of a task, and/or the selected requestor unit as in the second column from the left), a set of access and protection requirements, and a group of one or more associated responder elements (right hand column in the table of FIG. 5). For instance, in this example, entries 1 to 3 each specify a requesting actor in form of a task T12 that is executed on a requestor unit M0. In the example, the entries 4 to 8 specify, respectively, the following actors prefix T indicating a task, prefix M indicating a requestor unit: (T63, M0), (T17, M4), (T24, Mx), (T28, M0), and (T99, M0). In this context, the letter x may indicate a wild card. Wild cards may be allowed in each component of each entry of the authorization list. Thus, the notation Mx in line 6 indicates that the respective entry, namely entry number 6, applies to the task T24 executed on any of the possible requestor unit(s). Similar can be done with the task identifier e.g. (Tx,M3) defining that any task Tx that is executed on a master M3.

In the example of FIG. 5, entries number 1 to 8 may further specify access or protection requirements, e.g.: .user(=u)/supervisor(=s) mode, read(=r)/write(=w) permission, exclusive(=e) or shared(=c) access to the specified (set of) responder unit(s). The entries 1 to 8 of the example may further specify groups of one or more responder elements, for example: a memory range (e.g. mem_range_A,_B,_C,_X), a single or set of peripheral IP(s) (e.g. IP22, IP12), at least one subset (e.g. set_D) of responder elements within a single IP (e.g. IP38 set_D, or IP38 set_H), Each identifier, e.g., mem_range_A or IP22, may identify at least one specific group of responder elements 15 within the responder units 14. Each group of responder elements specified in the authorization list may be contained within a single responder unit 14. Alternatively, the group may extend across two or more responder units 14.

By way of illustration, a scenario in which a request for access to one or more responder elements within an integrated peripheral named IP38 is received is described hereafter. The peripheral IP38 may be one of the responder units 14 or be integrated therein. The request analysis unit 34, in response to receiving the request, may select the entries 4 and 8 of the authorization list 38 as relevant entries because each of these entries specifies IP38 and become the target responder elements 15' specified by the request of the present example are part of IP38. The request analysis unit 34 may then forward the relevant entries 4 and 8, or an extract thereof, to the target protection unit associated with IP38. The extract may, for instance, comprise the respective actor specification, e.g., (T63, M0) for entry number 4 and (T99, M0) for entry number 8 and the respective set of access requirements, e.g., us-w-c for entry number 4 and us-rw-c for entry number 8. The target protection unit may then further evaluate the request on the basis of the thus determined relevant protection data, possibly in conjunction with internal protection data associated with the target protection unit. The target protection unit may then, for example, grant or refuse the request or abort the requested access as a result of that further evaluation.

In a variant of the present example, the request analysis unit 34 may further perform a check as to whether the request conforms to only a subset or none of the relevant entries of the authorization list 38, i.e., entries 4 and 8 in the present example. For example, it might further select a subset of these entries based on its knowledge of the actual requesting actor (e.g. master M0 and/or task T63 or T99) and/or access properties (e.g. user/supervisor mode, read or write access) to select only entries having the capability to match, resulting in multiple, a single, or none valid entries. For the above example, the request analysis unit 34 may for instance determine that the request conforms to the access requirements specified in entry 8 but not to those of entry 4. In this case, the request analysis unit 34 may include in the relevant protection data only entry 8 or an extract thereof but no data from entry number 4. Additionally it may prune the relevant entries based on its knowledge about the actual task and/or master executing this task, identifying the requesting actor; any mismatch here can be used to reduce the selection effort.

In yet another variant of the present example, the request analysis unit 34 may further evaluate the selected information based on its knowledge of the actual requesting actor and the properties of the actual request, and provide only or additionally the resulting data to the target protection unit. This is especially true for the case where there is no valid entry; in this case the request analysis unit will provide a signal to simply deny or grant the access (dependent on the encoding of the authorization list to specify permitted or forbidden access combinations) to the target protection unit. In any of the described examples, the target protection unit may thus be enabled to perform an appropriate protective action for the target responder elements 15' on the basis of the relevant protection data. The target protection unit may notably refuse the request if the relevant protection data received from the request analysis unit 34 indicates that the request does not conform to the access requirements associated with the requesting actor and the group of target responder elements. As explained by way of an example in reference to FIG. 5, each entry of the authorization list may thus further specify one or more authorized actors. Determining the relevant protection data by the request analysis unit 34 may further comprise, for each entry of the authorization list: taking the access requirements specified by the respective entry into account only if the requesting actor is among the authorized actors specified by the respective entry. Taking into account of the access requirements by the request analysis unit 34 may notably comprise:

including in the relevant protection data the respective entry of the authorization list 38 or an extract of the respective entry. Taking into account of the access requirements by the request analysis unit 34 may notably comprise: including in the relevant protection data the access requirements of the respective entry or an extract thereof. Taking into account of the access requirements by the request analysis unit 34 may also comprise: generating an indication as to whether the set of request properties conforms to the access requirements specified by the respective entry, and including that indication in the relevant protection data.

The SoC 10 may be arranged to be clocked by a clock signal. The request analysis unit 34 may in this case determine the relevant protection data within a single clock cycle of the clock signal. The relevant protection data may thus be passed on to the target protection unit, e.g., one of the protection units 36, within a short time, thereby enabling the target protection unit and the association target responder unit to respond to the request without undue delay. The target protection unit may then perform the protective action within one or more clock cycles subsequent to the mentioned single clock cycle during which the request analysis unit 34 has determined the relevant protection data.

It is pointed out that the authorization list, e.g., the list 38 in FIG. 5 may be generated or updated in response to a task switch of any one of the requestor units. For instance, the tasks listed in column 2 of the authorization list 38 in FIG. 5 may be subtasks of tasks currently running on the requestor unit 12. For instance, requestor unit M0 may be running a task T99. When requestor unit M0 performs a task switch, it may stop running that task and start running a different task T29. The authorization list 38 may, in this case, be updated accordingly. Notably, the access requirements and responder elements associated with the new task may be included in the updated authorization list 38.

It is also noted that the authorization list may comprise two or more sub-lists partially or completely resident in different responder units 14 or in different protection units 36. For instance, the authorization list can be split into sub-lists, where each sublist contains the entries associated with a particular responder unit 14. In this case, the content of an entry may be reduced to hold only information to identify the requesting actor, the corresponding access and protection properties, and eventually further details required for subsequent checks within the responder unit; the information identifying the responder unit may be hold implicitly by associating with this responder unit.

Figures 6, 7, 8:
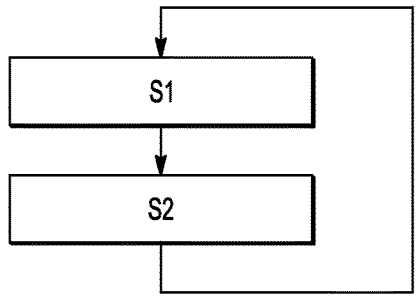
FIG. 6 shows a flow chart of an example of a protection method.
FIG. 7 schematically shows an example of an embodiment of a group identifier list.
FIG. 8 schematically shows an example of an embodiment of a group authorization list.

Operation of the system on chip 10 is further described in reference to the flow chart of FIG. 6. The operation may involve a first request processing stage S1 and a subsequent second request processing stage S2. In stage S1, a request for access to one or more target responder elements 15' may be generated by one of the requestor units 12, for example. The request analysis unit 34 may preprocess the request to determine one or more target protection units among the protection units 36 of the SoC 10. The request analysis unit 34 may further determine relevant protection data on the basis of the request and on the basis of an authorization list, for example, an authorization list as described above in reference to FIG. 5. The request analysis unit 34 may further provide that relevant protection data to the one or more target responder units. In the subsequent second request processing stage S2, each of the target responder units may further evaluate the request on the basis of the relevant protection data, and grant or deny access to the affected responder elements 15'.

The stages S1 and S2 may be repeated with the next received request. When S1 and S2 are repeated, the target responder elements 15' may be those of the first request or others among the target responder elements 15. It is also worth to note that the stage S1 of a subsequent request may overlap with the stage S2 of a previous request, since both stages involve in principle different hardware elements (the request analysis unit 34 performs its actions in stage S1, while the target responder and protection units selected during stage S1 are performing their action in stage S2.

Compared to the design described in reference to FIG. 1, in the design described above in reference to FIGS. 3 to 6 the group of components consisting of the request analysis unit 34 and the various protection units 36 can be less expensive than a single central access control unit as, e.g., the unit 18 described in reference to FIG. 1; especially when the functionality or granularity of the protection mechanism itself needs to be tailored to a specific responder unit or set of responder units; or when the protection mechanism is targeted to a specific feature or set of features in a responder unit. Additionally the distribution of responsibilities between the request analysis unit 34 and the protection unit(s) associated with their particular responder unit, allow a late evaluation of the access and protection information (which is itself reduced by the selection and pruning process performed by the request analysis unit). Last, but not least, an protection functionality that is IP specific is made possible by distributing the responsibilities in the described manner.

For instance, one of the responder units 14 may be arranged to provide a low-priority function which does not require a particularly fast evaluation of any request directed to that responder unit. The protection unit 36 associated with this responder unit may then be implemented using a relatively cheap design, for example, by arranging the respective protection unit 36 to further process the request and the relevant protection data in more than one clock cycle rather than in a single clock cycle. In many cases, the responder units 14 are in a different, often slower clock domain than the typical high speed requestor units.

A hierarchal request processing architecture is thus proposed, comprising a high level evaluation unit, namely the request analysis unit 34 and two or more low level units, namely, the protection units 36, which are subordinate to the high level unit. This structure may be particularly beneficial if at least two among the protection units 36 are different from each other. For instance, a first protection unit 36 may be arranged to perform the second stage S2 described in reference to FIG. 6 in a single clock cycle, while another one of the protection units 36 may be arranged to perform stage S2 in several consecutive clock cycles, or related to another, slower clock in the same SoC.

In another variant of the present example, two protection units 36 of two different responder unit 14 might use a specific encoding that is significantly different to specify the required access and protection information. A good example for this would be a first protection unit that is related to a memory block (RAM or Flash), which specifies a memory range by a start and end address. A second protection unit that is related to a peripheral block or a subset of registers within a peripheral block would use a different (and often IP specific or feature based) encoding to specify the corresponding registers; which may be allocated in non-contiguous manner, often interspersed with other registers, etc.

Referring now to FIGS. 7 and 8, an example of one of the protection units 36 of the system on chip 10 described above in reference to FIG. 3 is described. The remaining protection units 36 of the SoC 10 may be of a similar design.

The protection unit 36 may comprise a group mapping 40 of the various responder elements 15 in at least one responder unit 14 to at least one group; where each group relates to at least a specific feature of the at least one responder unit 14. In this context, feature corresponds to functionality or a hardware block or subsystem that implements a specific function within the responder unit (e.g. a timer, a FIFO block, a transmit or receive element or other hardware blocks) with all the corresponding registers and control logic. By this mapping, there may be a set of responder elements 15 related to a single feature or shared by multiple features. Each responder element 15 may thus be included in one or more groups. These groups may be referred to as protection groups. It is noted that such a group of responder elements 15 does not necessarily correspond to the physical arrangement of the responder elements 15 within the respective responder unit 14. For instance, two responder elements 15 provided in a common module of a responder unit 14 may be included in different groups. Furthermore, two responder elements belonging to different modules in the responder unit 14 may belong to the same group. The total number of groups thus defined may be smaller and even considerably smaller than the total number of responder elements in the responder unit 14 as more than one responder element may be assigned the same group identifier. In other words, each group may comprise more than one responder element.

For example, considering the example mapping 40 in FIG. 7, responder elements numbered 1 to 12 are each assigned one or more groups. In this example, responder elements 1 and 2 are each assigned to a first group G1, a second group G2, and a third group G3. Responder elements 3, 6 to 8 are each assigned to the group G1. Responder elements 4, 8 to 10 are each assigned to the group G2. Responder elements 5, an 11 to 12 are each assigned to a group G3. These assignments of responder elements to at least one group may be implemented statically by hardware, configured at synthesis time for the responder unit or the protection unit of this responder unit (and therefore also be static hardware), or implemented in form of an association list that may provide the assignment of at least one group identifier to every responder element 15 by software. In the following, a distinction between a group identifier in such an association list (e.g., G1) and the corresponding group is not necessarily made (and may actually not exist, like it is in case of a mapping by hardware), and any group may be referred to by its identifier. For example, the group identified by the group identifier G1 may be referred to simply as the group G1.

For illustration purposes the example in FIG. 7 provides two more columns; a first column named "reg name" containing the mnemonic for the register name (e.g. GCR), and a second column named "comment" describing the function of this register. Both columns describe a usual register set for an example of a peripheral block. The intent is to show by an example possible responder elements in form of control/status/data registers for a responder unit that for example implements three distinct features in form of three communication channels CH1-CH3. This information is only for illustration purposes and will not be stored in hardware or recorded in an association list.

The protection unit 36 may further be arranged to provide a group authorization list 42. The group authorization list 42 may assign a set of access requirements to each group identified by the group mapping 40. An example of a group authorization list 42 is schematically shown in FIG. 8. In this example, the group identifiers G1, G2, and G3 are assigned at least one set of access requirements for a specific requestor; in particular the group G1 has the access requirements us-rx-e for any task (T*) executed on the master M0, and the access requirements s-r-c for any task (T*)_ executed on the master M1. The group G2 has the access requirements s-rw-e for any requestor (identified by any task T* and any master M*). The group G3 has the access requirements su-rw-c for the task T2 executed on master M0, the access requirements u-r-c for the task T99 executed on any master M*, and the access requirements u-rw-c for the task T113 executed on master M1. It is worth to note that the above example assumes to specify only the permitted access requirements, any non-specified access requirements would result in an inhibited access; an alternative implementation may specify only the non-permitted access requirements and assume valid accesses otherwise. Another alternative implementation may allow to choose between both of the above methods with a selector. As described by the above examples, the group mapping 40 in conjunction with the group authorization list 42 may thus assign one or more sets of access requirements to each responder element 15 of the respective responder unit 14. As such it allows a more fine granular protection of groups consisting of at least one responder element 15 within a responder unit 14; in addition to the more global protection of all accesses to the responder unit 14 that may use the same protection unit to perform the basic protection functionality (e.g. inhibiting or aborting the actual access) itself.

The assignment of protection groups as described in reference to FIGS. 7 and 8, e.g., protection groups G1, G2, and G3, may thus allow to define a set of access requirements for a group of responder elements by means of a single entry. For example, the second protection group defined by the group mapping 40, i.e., the group of responder elements 1,2,4, and 8-10 identified as group G2, may be assigned the set of protection requirements s-rw-e by means of a single entry e.g. the entry 3 of the group authorization list 42 in FIG. 8. Furthermore, these protection requirements can be further refined for a specific requestor; i.e. the group of responder elements 1-3, and 6-8 identified as group G1 may be assigned the set of protection requirements us-rx-e for any task executed on the master M0, and the set of protection requirements s-r-c for any task executed on the master M1. More complex specifications of protection requirements of specific requestors like the ones described for the group of responder elements G3 are also possible.

Compared to an alternative design in which each responder element is assigned a set of access requirements directly, i.e. without an assignment of protection groups to the various responder elements, the hardware that is necessary for defining the access requirements and for evaluating a request can be significantly reduced. Alternative implementations that allow to assign protection properties to address ranges are not sufficient when the feature to be protected uses shared resources (responder elements), or is controlled by a set of responder elements that are distributed over the address map and the address range includes responder elements related to other features. Furthermore, the proposed grouping of responder elements into protection groups may render the protection scheme more transparent for both developers and customers.

A protection group, i.e., a group identified by a group identifier in the group identifier list, may consist of a single responder element. For instance, the group mapping 40 may comprise a further entry (not shown) assigning a group identifier G4 to a responder element number 13, wherein responder element number 13 is the only responder element in the group G4. A very fine protection granularity may thus be achieved.

The protection unit 36 may operate as follows. The protection unit 36 may receive a request for access to one or more target responder elements 15' among the responder elements 15 of the respective responder unit 14. The protection unit 36 may further determine, for each of the target responder elements 15', the corresponding group identifier, e.g., G1, from the group identifier list 40. It may then further determine the corresponding one or more sets of access requirements, e.g., us-rx-e, from the group authorization list 42, together with the associated requestor information. The protection unit 36 may further evaluate the request with respect to the thus determined set of access requirements and requestor information to generate a request evaluation result. The request evaluation result may indicate an extent to which the request conforms to this set of access requirements and requestor information. For example, the request evaluation result may simply indicate whether or not the request conforms to this set of access requirements.

The protection unit 36 may be arranged to take the relevant protection data provided by the requests analysis unit 34 into account when evaluating the request. The request evaluation result may in this case indicate an extent to which the request conforms to both the access requirements and requestor information from the group authorization list 42 and the relevant protection data from the request analysis unit 34.

The protection unit 36 may further be arranged to perform one or more of the following actions in dependence on the request evaluation result: grant the request, refuse the request, abort the access requested by the request, and/or generate an error signal. Additionally it may provide related information to the request analysis unit 34 for further analysis by the system.

The group mapping 40 or the group authorization list 42, or both, may be static. Each of these lists may, for example, be implemented entirely in non-programmable hardware or be implemented in one-time programmable hardware. Alternatively, these lists can be made programmable by providing a set of registers to define their content; and these registers may be locked against further modifications once the respective list has been stored in the register(s). It is pointed out that the different protection units 36 may differ in their group mapping 40 or in their group authorization list 42 or in both. For example, the set of protection units 36 of the SoC 10 may comprise a first protection unit 36 and second protection unit 36, and the group mapping 40 provided by the first protection unit 36 may differ from the group mapping 40 provided by the second protection unit 36. The group protection scheme described herein may thus be adapted individually to each protection unit 36 based on knowledge about the at least one responder unit 14 protected by this protection unit 36. This enables an unit specific group mapping 40 (taking into account the association of features with responder elements 15 that is specific for this responder unit 14) and allows a group authorization list 42 specific for this responder unit 14. For example, in case the responder unit is a memory block, the amount of bits used to identify a memory range can be adapted to the possible range for this memory block. In an alternative implementation, when the responder unit is a peripheral block having multiple sets of (eventually interleaved) register blocks, each of them associated with a feature, a different scheme can be used that provides a set identifier (or a mask enabling multiple sets) and a second mask for the registers within a set. Yet another implementation example for a peripheral block may use a mask for global registers and a set identifier for registers that are associated with a single feature. Consequently, the group authorization list 42 provided by the first protection unit 36 may differ from the group authorization list 42 provided by the second protection unit 36.

Each of the responder elements 15 may have an address and may be addressable individually by means of its address. Any given responder element 15 may thus be addressed individually and yet be protected as part of a protection group that may comprise further responder elements.

Figure 9:
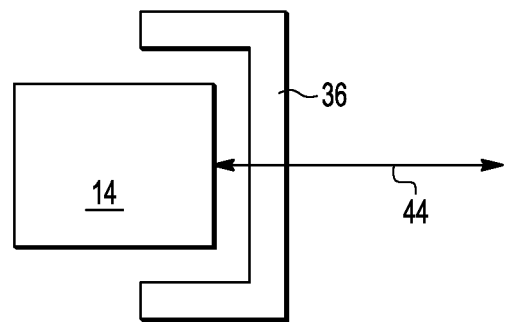
FIG. 9 schematically shows a block diagram of an example of an embodiment of a protection unit.
Figure 10:
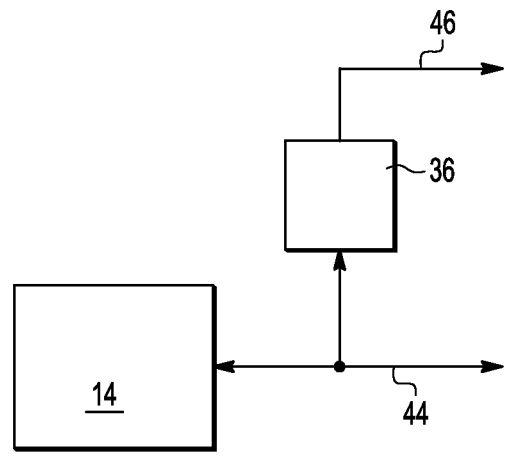
FIG. 10 schematically shows a block diagram of an example of an embodiment of a protection unit.

Each protection unit 36 may, for example, be implemented either as a protection wrapper or as protection companion, as schematically illustrated in FIGS. 9 and 10. Referring to FIG. 9, the protection wrapper 36 may be arranged to inhibit or to abort a requested access to one or more responder elements 15 within the associated responder unit 14. In contrast, the protection companion 14 shown in FIG. 10 may be arranged to take the role of an observer which does not inhibit or abort access to the responder unit 14 but merely provides the request evaluation result 46. It should be noted that a protection wrapper may in addition to taking an action, provide the request evaluation result 46 as well. A request evaluation result may, for instance, be provided to the requesting requestor unit, e.g., to one of the units 12, to the request analysis unit 34 or to a failure processing unit (not shown) that may be shared among several responder units 14, or to multiple of these units.

Each protection group defined by, e.g., the group mapping 40, may, for instance, be associated with a particular function or functionality provided by the respective group of responder elements 15. In the example of FIG. 7, for instance, group identifiers G1, G2, and G3 may relate to a first, second, and third function associated with the respective group of responder elements 15. For instance, responder elements numbered 1 to 3, and 6 to 8 (group G1) may be required for providing a pulse-width modulation function; elements numbered 1,2,4 and 8 to 10 (group G2) may be required for providing a counter function, and elements 1,2,5 and 11 to 12 (group G3) may be required to provide a timer function. It is noted that any responder element 15 may be shared among two or more functions. Such responder elements may be referred to as common elements. For instance, in the example of FIG. 7, responder elements number 1, 2, and 8 may be shared among the pulse-width modulation function and the counter function.

In the foregoing specification, the invention has been described with reference to specific examples of embodiments of the invention. It will, however, be evident that various modifications and changes may be made therein without departing from the broader scope of the invention as set forth in the appended claims and that the scope of the claims is not limited to the described examples.

Each authorization list described herein may be implemented by listing one or more allowed access operations or equivalently by listing one or more forbidden access operations; eventually in combination with requestor information i.e. the requesting master, an associated task identifier and further information.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system on chip, comprising:
two or more responder units; and
two or more protection units, wherein
each of said responder units comprises a set of responder elements including first, second, third, and fourth responder elements,
each of said protection units is associated with and protects one of said responder units and is arranged to:
provide a group mapping, wherein said group mapping assigns one or more group identifiers to each responder element of a respective responder unit and at least two of said responder elements of the set of responder elements of each of the responder units are assigned the same group identifier by a group identifier list, wherein the first and second responder elements provide a first function and are assigned a first group identifier, and the third and fourth responder elements provide a second function and are assigned a second group identifier, wherein the first and second functions are different,
provide a group authorization list, wherein said group authorization list assigns a set of access requirements to each of said group identifiers, wherein the set of access requirements includes allowing a first requestor access to a first target responder element of the target responder elements only during specific time slices and inhibiting access during other time slices,
receive a request for access to one or more target responder elements among the responder elements of the respective responder unit,
for each of said target responder elements, determine a corresponding one or more group identifiers from said group mapping and further determine a corresponding one or more sets of access requirements from said group authorization list, and
compare said request with respect to the determined set of access requirements, to generate a request evaluation result.

2. The system on chip of claim 1, wherein said group mapping or said group authorization list or both are static.

3. The system on chip of claim 2, wherein one or more of the group mapping and the group authorization list are configured in non-modifiable hardware.

4. The system on chip of claim 2, further comprising a set of registers lockable against further modifications after being programmed, for configuring said group mapping and group authorization list by programming said set of registers, and subsequent locking of said set of registers.

5. The system on chip of claim 1, wherein said two or more protection units include a first protection unit and a second protection unit, and the group mapping provided by the first protection unit differs from the group mapping provided by the second protection unit.

6. The system on chip of claim 1, wherein said two or more protection units include a first protection unit and a second protection unit, and the group authorization list provided by the first protection unit differs from the group authorization list provided by the second protection unit.

7. The system on chip of claim 1, wherein the group authorization list used by at least one of the protection units is stored in a respective protection unit.

8. The system on chip of claim 7, further comprising:
a request analysis unit arranged to:
determine relevant protection data on the basis of said request and on the basis of a system authorization list comprising multiple entries, and
provide selector criteria to a selected protection unit, wherein said selector criteria is based on the determined relevant protection data and enables the selected protection unit to determine said corresponding one or more group identifiers from said group mapping and further determine said corresponding one or more sets of access requirements from said group authorization list stored in the selected protection unit.

9. The system on chip of claim 1, wherein the group authorization list used by at least one of the protection units is provided by another unit within the system on chip.

10. The system on chip of claim 2, wherein said group mapping is implemented by combinatorial logic or masks enabling responder elements located at non-contiguous addresses or varying address offsets to be mapped to the same group identifier.

11. The system on chip of claim 1, wherein each of said responder elements of the set of responder elements has an address and is addressable individually by means of the responder element address.

12. The system on chip of claim 1, wherein said request evaluation result is indicative of an extent to which said request conforms to said determined one or more sets of access requirements.

13. The system on chip of claim 1, wherein each of said protection units is further arranged to
perform one or more of the following in dependence on said evaluation result:
grant said request to an associated responder unit or corresponding target responder elements; refuse said request to the associated responder unit or the corresponding target responder elements; abort the access requested by said request to the associated responder unit or the corresponding target responder elements; generate an error indication.

14. The system on chip of claim 13, wherein each of said protection units is arranged to provide further information about a refused or aborted request to another unit for error processing or recording within the system on chip.

15. A system on chip, comprising:
two or more responder units; and
two or more protection units, wherein
each of said responder units comprises a set of responder elements,
each of said protection units is associated with and protects one of said responder units and is arranged to:
provide a group mapping, wherein said group mapping assigns one or more group identifiers to each responder element of a respective responder unit and at least two of said responder elements of the set of responder elements of each of the responder units are assigned the same group identifier by a group identifier list, wherein a first responder element and a second responder element provide a first function and are assigned a first group identifier, and a third responder element and a fourth responder element provide a second function and are assigned a second group identifier, wherein the first and second functions are different,
provide a group authorization list, wherein said group authorization list assigns a set of access requirements to each of said group identifiers wherein the group authorization list used by at least one of the protection units is provided by another unit within the system on chip,
receive a request for access to one or more target responder elements among the responder elements of the respective responder unit,
for each of said target responder elements, determine a corresponding one or more group identifiers from said group mapping and further determine a corresponding one or more sets of access requirements from said group authorization list, and
compare said request with respect to the determined set of access requirements, to generate a request evaluation result,
wherein the group authorization list is provided by a request analysis unit arranged to receive from a requesting actor said request,
wherein said request analysis unit is further arranged to determine relevant protection data on the basis of said request and on the basis of a system authorization list comprising multiple entries,
wherein said determining of said relevant protection data comprises, for each entry of said system authorization list, to identify entries related to the actor, and to identify entries related to a target responder unit, and
wherein said request analysis unit is further arranged to provide said relevant protection data to at least one target protection unit, said at least one target protection unit being a protection unit associated with a selected target responder unit, and located in a hierarchical path between a requesting requestor unit and said target responder unit.

16. A system on chip, comprising:
first and second responder units; and
first and second protection units, wherein
the first responder unit comprises a first set of responder elements and the second responder unit comprises a second set of responder elements,
the first protection unit is associated with and protects the first responder unit and the second protection unit is associated with and protects the second responder unit, the first protection unit is arranged to:
provide a group mapping, wherein the group mapping assigns one or more group identifiers to each responder element of the first responder unit and at least two of the responder elements of the first set of responder elements are assigned the same group identifier by a group identifier list, wherein a first responder element and a second responder element provide a first function and are assigned a first group identifier, and a third responder element and a fourth responder element provide a second function and are assigned a second group identifier, wherein the first and second functions are different,
provide a group authorization list, wherein said group authorization list assigns a set of access requirements to each of the group identifiers,
receive a request for access to one or more target responder elements among the responder elements of the first responder unit,
for each of the target responder elements, determine a corresponding one or more group identifiers from said group mapping and further determine a corresponding one or more sets of access requirements from said group authorization list, wherein the set of access requirements includes allowing a first requestor access to a first target responder element of the target responder elements only during specific time slices and inhibiting access during other time slices, and
compare said request with respect to the determined set of access requirements, to generate a request evaluation result.

17. The system on chip of claim 16, wherein the first target responder element is preconfigured by a manufacturer to provide an original function in the first responder unit.

18. The system on chip of claim 17, wherein a fifth responder element of the first set of responder elements stores a third function on the first responder unit, wherein the third function is installed by a customer.

19. The system on chip of claim 16, wherein the first protection unit is arranged to provide further information about a refused or aborted request to another unit for error processing or recording within the system on chip.

20. The system on chip of claim 16, wherein the group authorization list provided by the first protection unit differs from a second group authorization list provided by the second protection unit.

* * * * *